US012202553B2

(12) United States Patent
Lee

(10) Patent No.: US 12,202,553 B2
(45) Date of Patent: Jan. 21, 2025

(54) STEERING APPARATUS FOR VEHICLE

(71) Applicant: HYUNDAI MOBIS CO., LTD., Seoul (KR)

(72) Inventor: Suk Won Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 58 days.

(21) Appl. No.: 17/969,109

(22) Filed: Oct. 19, 2022

(65) Prior Publication Data

US 2023/0134775 A1 May 4, 2023

(30) Foreign Application Priority Data

Nov. 1, 2021 (KR) ........................ 10-2021-0147884

(51) Int. Cl.
*B62D 3/12* (2006.01)
*B62D 15/02* (2006.01)

(52) U.S. Cl.
CPC ......... *B62D 3/126* (2013.01); *B62D 15/0225* (2013.01)

(58) Field of Classification Search
CPC ...... B62D 15/0225; B62D 3/12; B62D 5/049; B62D 5/04; B62D 5/0454; B60G 17/019; B60F 2204/11; B60R 16/02
USPC ............................ 280/93.5, 93.514; 180/444
See application file for complete search history.

(56) References Cited

U.S. PATENT DOCUMENTS

| 6,298,941 | B1 * | 10/2001 | Spadafora | F15B 13/021 |
| | | | | 701/41 |
| 9,254,868 | B2 * | 2/2016 | Ando | B60G 17/019 |
| 11,427,250 | B2 * | 8/2022 | Chae | B62D 3/02 |
| 2017/0151981 | A1 * | 6/2017 | Suzuki | B62D 7/1509 |
| 2018/0154932 | A1 * | 6/2018 | Rakouth | B62D 1/286 |
| 2022/0281513 | A1 * | 9/2022 | Lee | B62D 15/0225 |

FOREIGN PATENT DOCUMENTS

| KR | 20220126137 A | * | 3/2021 |
| KR | 20230076928 A | * | 11/2021 |

\* cited by examiner

*Primary Examiner* — Paul N Dickson
*Assistant Examiner* — Caitlin Anne Miller
(74) *Attorney, Agent, or Firm* — NSIP Law

(57) ABSTRACT

A steering apparatus for a vehicle includes: a rack housing; a rack bar inserted into an inner portion of the rack housing and moving linearly in a lengthwise direction of the rack housing; a housing mounted on the rack housing; a first sensing section mounted on the housing to sense an amount of movement of the rack bar while being rotated in mesh with the rack bar as the rack bar moves linearly on the rack housing; and a second sensing section mounted on the rack housing to sense the amount of movement of the rack bar within an on-center section.

7 Claims, 6 Drawing Sheets

STEERING APPARATUS FOR VEHICLE

CROSS-REFERENCE TO RELATED APPLICATION

This application claims the benefit under 35 USC § 119(a) of Korean Patent Applications No. 10-2021-0147884, filed on Nov. 1, 2021, the entire disclosure of which are incorporated herein by reference for all purposes.

BACKGROUND

Field

Exemplary embodiments of the present disclosure relate to a steering apparatus for a vehicle, and more particularly, to a steering apparatus for a vehicle, configured to be able to improve assemblability of parts and improve measurement accuracy.

Discussion of the Background

In general, an electric steering system applied to a vehicle is configured to include a steering system from a steering wheel to both driving wheels, and an auxiliary power system that supplies the steering system with steering auxiliary power.

Here, the steering system is configured to include a steering shaft with an upper end thereof being connected to the steering wheel and a lower end thereof being connected to a pinion shaft via a pair of universal joints, the steering shaft rotating together with the steering wheel. Further, the pinion shaft is connected to a rack bar through a rack-pinion mechanism, and opposite ends of the rack bar are connected to the wheels through tie rods and a knuckle arm.

The rack-pinion mechanism is formed such that the pinion gear formed on a lower end of the pinion shaft is meshed with a rack gear formed on one side of an outer circumferential surface of the rack bar, and rotational motion of the pinion shaft is changed into a linear motion of the rack bar.

When a driver operates the steering wheel, the pinion shaft is rotated, the rack bar moves linearly in an axial direction according to the rotation of the pinion shaft, and the linear movement of the rack bar steers the driving wheels through the tie rod and the knuckle arm.

The auxiliary power mechanism is configured to include a torque sensor that senses steering torque that the driver applies to the steering wheel and that outputs an electric signal proportional to the steering torque, an electronic control unit that generates a control signal on the basis of the electric signal provided by this torque sensor, and a motor that generates steering auxiliary power on the basis of the control signal provided by the electronic control unit.

The electric steering system is formed such that the steering torque generated by the rotation of the steering wheel is transmitted to the rack bar via the rack-pinion mechanism, and the steering auxiliary power generated by the motor according to the generated steering torque is transmitted to the steering shaft, the pinion shaft, or the rack bar. That is, the steering torque generated by the steering system and the steering auxiliary power generated by the motor are combined to cause the rack bar to move in an axial direction.

A steer-by-wire (SBW) system is a steering system that separates mechanical connection between the steering wheel and the driving wheels of the vehicle, that receives a rotation signal of the steering wheel, and that operates a steering motor connected to the driving wheels on the basis of the received rotation signal, and thereby steering the vehicle.

The SBW system is removed from the mechanical connection structure having the existing steering system, and thereby has advantages of increasing a degree of layout freedom depending on the steering system configuration, improving gas mileage, removing disturbance input reversely from the driving wheels, and so on.

In contrast, there is a disadvantage that steering information required cannot be properly feedbacked by a driver due to disconnection of the mechanical connection structure.

To satisfy requirement characteristics of on-center (or a neutral position of the steering wheel) of a steering angle sensor (SAS) applied to a conventional SBW system, the conventional SBW system has a structure to which excessive specification is applied.

To add to explanation, in the past, a worm shaft gear section coming into contact with the gear section of the rack bar has a structure that is fixed to the rack housing in order to implement SAS performance, and that fixes a sensor apart from the SAS is fixed to a shaft at an upper end of the worm shaft gear section, and then has a separate waterproof cover that covers the entire sensor.

That is, the conventional steering system for a vehicle to which the SBW system is applied has a problem in that a shape of a system housing is complicated, a problem in that assemblability by configured part is difficult, as well as a problem in that excessive specification is applied and is inefficient compared to function and performance requirement conditions.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

According to an aspect of the present disclosure, the present disclosure has been invented to solve the problems as described above, and is directed to providing a steering apparatus for a vehicle, capable of improving assemblability of parts and improving measurement accuracy.

In one general aspect, a steering apparatus for a vehicle includes: a rack housing; a rack bar inserted into an inner portion of the rack housing and configured to move linearly in a lengthwise direction of the rack housing; a housing mounted on the rack housing; a first sensing section mounted on the housing and configured to sense an amount of movement of the rack bar while being rotated in mesh with the rack bar; and a second sensing section mounted on the rack housing and configured to sense the amount of movement of the rack bar within an on-center section.

The rack housing may include: a hollow housing body section including open ends through which the rack bar passes; a housing mount section disposed on an outer surface of the housing body section and configured such that each of the housing and the second sensing section is mounted on the housing mount section; and one or more housing hole sections formed on the housing mount section and configured such that the first sensing section and the second sensing section are disposed on the one or more housing hole sections.

The housing mount section may include a first housing mount section on which the housing is mounted, and a second housing mount section on which the second sensing section is mounted.

The one or more housing hole sections may include a first housing hole section on which the first sensing section is disposed, and a second housing hole section on which the second sensing section is disposed.

The first sensing section may include: a transfer gear part mounted on the housing in a rotatable manner and configured to rotate in mesh with the rack bar; one or more sensing gear parts mounted on the housing in a rotatable manner and configured to rotate in mesh with the transfer gear part; and a first sensing board part configured to sense an amount of rotation of the one or more sensing gear parts.

The second sensing section may include a holder mounted on the housing mount section and defining a mounting recess formed on an outer surface thereof; a second sensing board part mounted on an inner side of the mounting recess disposed in the holder and configured to sense a magnet mounted on a middle portion of the rack bar; and a cover part covering the outer surface of the holder.

The second sensing section may be configured to sense a position of the magnet moving along with the rack bar within a sensing range of the second sensing board part.

The housing may include a lower housing and an upper housing covering the lower housing.

The lower housing may include a lower storage section, an upper side of which is open; a lower support section disposed on the lower storage section and supporting the first sensing section in a rotatable manner; a lower opening section disposed on one side of the lower storage section and communicating with the rack housing to expose the first sensing section; and a lower enlarging section extending from one side of the lower storage section and coupled to the rack housing.

The upper housing may include: an upper storage section covering the lower storage section; an upper support section disposed on the upper storage section and supporting the first sensing section in a rotatable manner; an upper opening section disposed on one side of the upper storage section and communicating with the rack housing to expose the first sensing section; and an upper enlarging section extending from one side of the upper storage section and coupled to the rack housing.

The present disclosure has an effect capable of accurately sensing steered states of the driving wheels by attaching a housing to a rack housing, by causing a rack bar passing through the rack housing to be meshed with a first sensing section housed in the housing, and by measuring rotation of the first sensing section.

Further, the present disclosure has an effect of accurately sensing forward movement alignment states of the driving wheels by a second sensing section sensing a magnet mounted on a central portion of the rack bar.

Other features and aspects will be apparent from the following detailed description, the drawings, and the claims.

DETAILED DESCRIPTION

Figure 1:
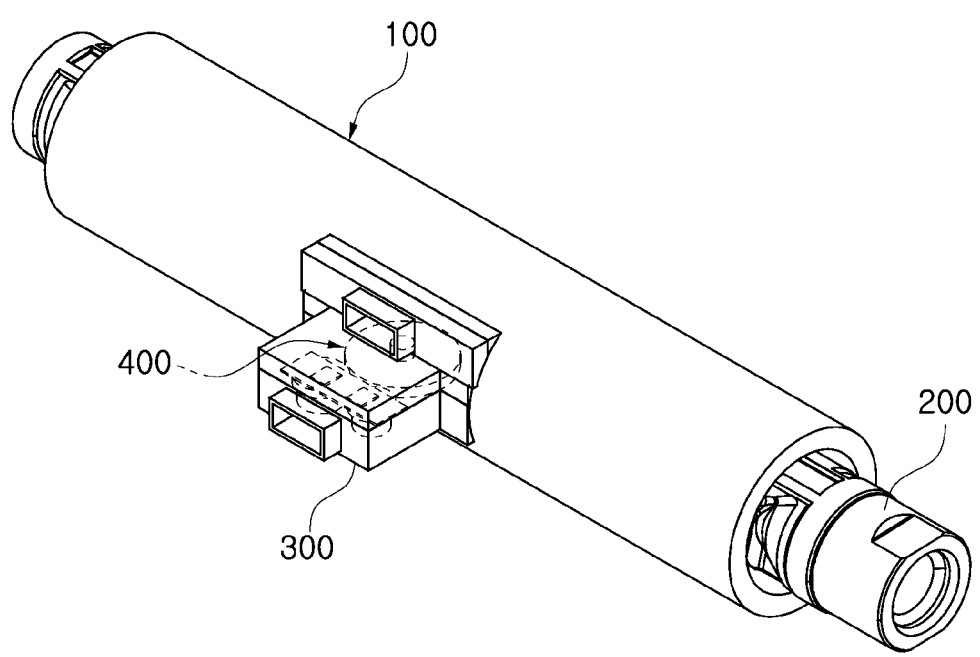
FIG. 1 is an external perspective view illustrating a steering apparatus for a vehicle according to an embodiment of the present disclosure.

Hereinafter, a steering apparatus for a vehicle according to the present disclosure will be described with reference to the attached drawings. In this process, thicknesses of lines shown in the drawings and sizes of constituent elements may be exaggerated for clarity and convenience. Further, the following terms are defined, considering their functions in the present disclosure, and may be varied according to intentions and customs of a user or a manager. Thus, the terms used herein should be defined based on the contents of the entire specification.

Figure 2:
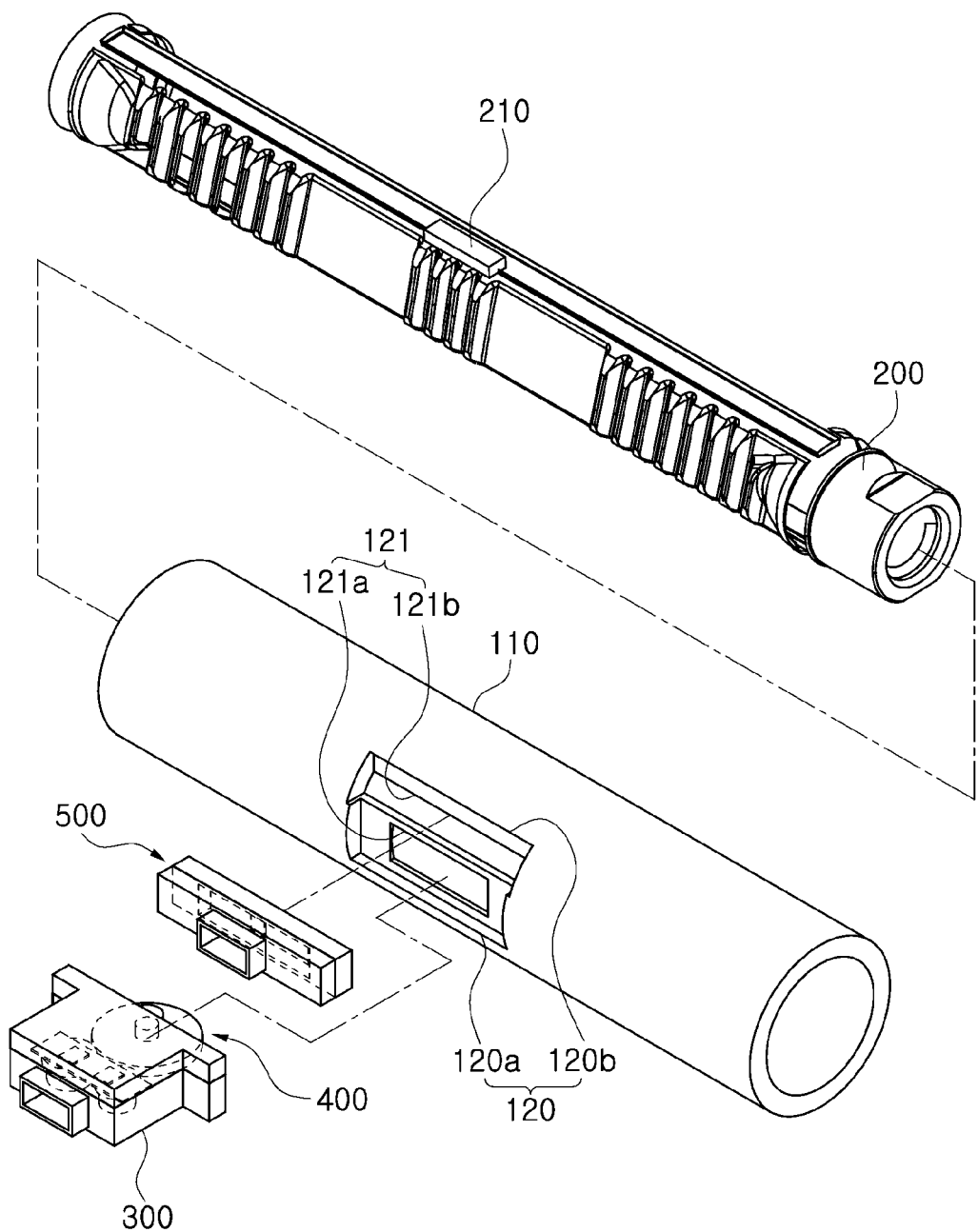
FIG. 2 is an exploded perspective view illustrating the steering apparatus for a vehicle according to an embodiment of the present disclosure.

FIG. 1 is an external perspective view illustrating a steering apparatus for a vehicle according to an embodiment of the present disclosure, and FIG. 2 is an exploded perspective view illustrating the steering apparatus for a vehicle according to an embodiment of the present disclosure.

Referring to FIGS. 1 and 2, a steering apparatus for a vehicle according to an embodiment of the present disclosure includes a rack housing 100, a rack bar 200, a housing 300, a first sensing section 400, and a second sensing section 500.

The rack housing 100 is provided to the vehicle body. The rack housing 100 has a cylindrical shape, and can be fixedly installed in the vehicle body. The rack housing 100 can communicate with the housing 300.

The rack bar 200 is inserted into an inner portion of the rack housing 100, and can move linearly in a lengthwise direction (or an axial direction) of the rack housing 100. The rack bar 200 passes through the rack housing 100, is moved according to manipulation of the steering wheel disposed at the driver's seat, and thereby can change angles of the driving wheels.

The magnet 210 can be mounted on the on-center section that is the central portion of the rack bar 200. To add to explanation, the magnet 210 is rested at an upper end of the central portion of the rack bar 200.

The term "on-center section" refers to a region of the central portion of the rack bar 200. Thus, when the rack bar 200 is located in the middle of the on-center section, the steering wheel is disposed in a neutral position. That is, in a case in which the rack bar 200 is within the on-center section, the steering wheel is disposed in the neutral position. In a case in which the rack bar 200 is outside of the on-center section, the steering wheel deviates from the neutral region.

The rack bar 200 is gear-connected by a driving means (not illustrated), and can be moved in the axial direction as the driving means is driven according to manipulation of the steering wheel.

The housing 300 is mounted on the rack housing 100. The housing 300 can be attached to the rack housing 100 to communicate with the rack housing 100.

The first sensing section 400 is mounted on the housing 300. The first sensing section 400 is rotated in mesh with the rack bar 200, and senses an amount of movement of the rack bar 200.

The first sensing section 400 is mounted on the housing 300 in a rotatable manner, and a part thereof protrudes from the housing 300 toward the rack bar 200, and can be meshed with the rack bar 200.

The first sensing section 400 and the rack bar 200 can be coupled in a rack-pinion mode. Accordingly, the linear motion of the rack bar 200 is converted into a rotational motion of the first sensing section 400. The first sensing section 400 is rotated to correspond to the amount of movement of the rack bar 200.

That is, when the amount of movement of the rack bar 200 is large, an amount of rotation of the first sensing section 400 becomes large in proportion. When the amount of movement of the rack bar 200 is small, the amount of rotation of the first sensing section 400 is reduced. The amount of rotation measured from the first sensing section 400 is transmitted to the control unit (not illustrated), and the control unit can accurately calculate a rotation angle of the driving wheels on the basis of the amount of rotation of the first sensing section 400.

The rack housing 100 according to the present embodiment includes a housing body section 110, a housing mount section 120, and a housing hole section 121.

The housing body section 110 has a hollow cylindrical shape having open opposite ends such that the rack bar 200 is disposed in a penetrated form. The rack bar 200 is disposed in the inner portion of the housing body section 110 in a penetrated form. The housing body section 110 may be formed such that an outer surface thereof has an angled shape, and may be fixed to the vehicle body by a separate fixing means.

The housing mount section 120 is formed in the housing body section 110. The housing 300 is mounted on the housing mount section 120.

The housing mount section 120 can be formed in an outer circumferential surface of the housing body section 110 in a recess shape. The housing mount section 120 can be provided with a first housing mount section 120a on which the housing 300 is mounted, and a second housing mount section 120b formed on an upper side of the first housing mount section 120a and on which the second sensing section 500 is mounted.

The first housing mount section 120a can be formed in an outer surface of the housing mount section 120 in a stepped shape. Thereby, the housing 300 is position-fixed on the housing mount section 120 while being hung on the first housing mount section 120a.

The second housing mount section 120b can be formed in an outer surface of the housing mount section 120 in a stepped shape. Thereby, the second sensing section 500 is position-fixed on the housing mount section 120 while being hung on the second housing mount section 120b.

The housing hole section 121 includes a first housing hole section 121a formed on the first housing mount section 120a, and a second housing hole section 121b formed on the second housing mount section 120b.

The housing body section 110 communicates with the exterior of the housing through the first housing hole section 121a. When the housing 300 is mounted on the first housing mount section 120a, the first sensing section 400 is disposed in the first housing hole section 121a at an inner portion of the housing 300.

The housing body section 110 communicates with an outer portion of the housing through the second housing hole section 121b. The second sensing section 500 is inserted into the second housing hole section 121b, and is installed on the housing body section 110 while being hung on the first housing mount section 120a.

Figure 3:
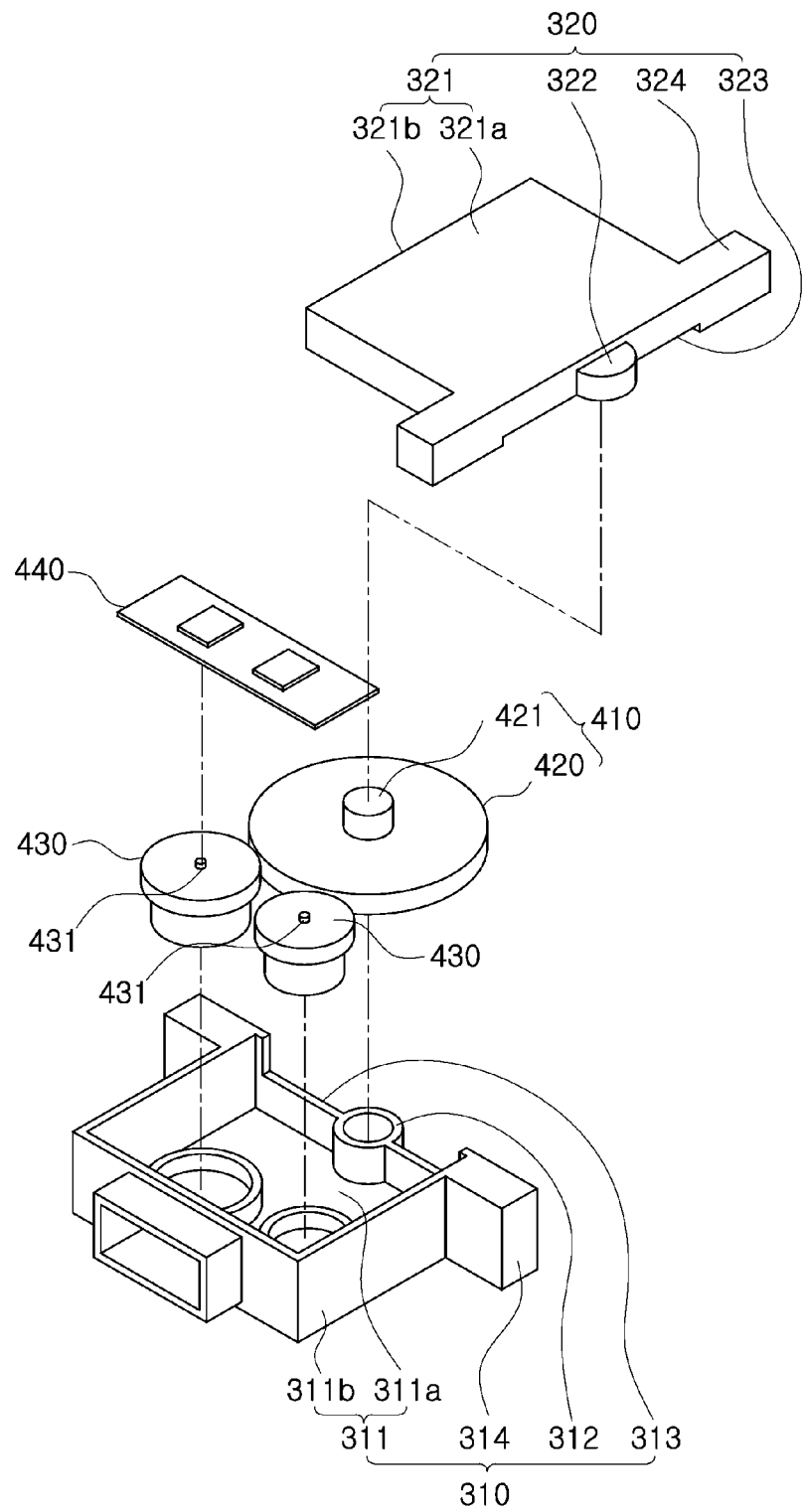
FIG. 3 is an exploded perspective view illustrating a housing of the steering apparatus for a vehicle according to an embodiment of the present disclosure.

FIG. 3 is an exploded perspective view illustrating a housing of the steering apparatus for a vehicle according to the embodiment of the present disclosure.

Referring to FIG. 3, the housing 300 according to the embodiment of the present disclosure includes a lower housing 310 and an upper housing 320.

The lower housing 310 has a shape in which an upper side thereof is open, and the upper housing 320 covers the opened portion of the lower housing 310. The upper housing 320 and the lower housing 310 can be assembled up and down. An O-ring or silicone is applied to a contact portion between the lower housing 310 and the upper housing 320, and can interrupt inflow of foreign materials into the interior.

The lower housing 310 can include a lower storage section 311, a lower support section 312, a lower opening section 313, and a lower enlarging sections 314.

The lower storage section 311 has a shape in which an upper side thereof is open. The lower storage section 311 includes a lower storage bottom part 311a, and a lower storage edge part 311b extending upward from an edge of the lower storage bottom part 311a.

The lower support section 312 is formed on the lower storage section 311, and supports the first sensing section 400 in a rotatable manner. One or more lower support sections 312 are formed depending on the structure of the first sensing section 400, and can support rotation of the first sensing section 400. In this case, a bearing for reducing rotation resistance can be provided to the lower support section 312.

The lower opening section 313 is formed on one side of the lower storage section 311, and communicates with the rack housing 100 to expose the first sensing section 400 to an outer surface of the lower storage section 311. The lower opening section 313 is formed on one surface of the lower storage edge part 311b, and may have a shape corresponding to that of the housing hole section 121.

The lower enlarging sections 314 extend from one side of the lower storage section 311, and are coupled to the rack housing 100. The lower enlarging sections 314 extend from one surface of the lower storage section 311 to left and right opposite sides respectively, and can confront the housing mount section 120. The lower enlarging sections 314 can be attached to the housing mount section 120.

The upper housing 320 according to the embodiment of the present disclosure includes an upper storage section 321, an upper support section 322, an upper opening section 323, and upper enlarging sections 324.

The upper storage section 321 has a shape in which a lower side thereof is open. The upper storage section 321 can include an upper storage ceiling part 321a and an upper storage edge part 321b. The upper storage edge part 321b is formed on an edge of the upper storage ceiling part 321a and extends downward.

The upper support section 322 is formed on the upper storage section 321, and supports the first sensing section 400 so as to be rotatable. One or more upper support sections 322 are formed depending on the structure of the first sensing section 400, and can support rotation of the first sensing section 400. In this case, a bearing for reducing rotational resistance can be provided to the upper support section 322.

The upper opening section 323 is formed on one side of the upper storage section 321, and communicates with the rack housing 100 to expose the first sensing section 400 to an outer surface of the upper storage section 321. The upper opening section 323 is formed on one surface of the upper storage edge part 321*b*, and may have a shape corresponding to that of the housing hole section 121. In this case, the first sensing section 400 can be exposed to the exterior through the upper opening section 323 and the lower opening section 313.

Depending on the design, the first sensing section 400 can be exposed only through any one of the lower opening section 313 and the upper opening section 323. In this structure, the other of the lower opening section 313 and the upper opening section 323 can be omitted.

The upper enlarging sections 324 extends from one side of the upper storage section 321, and is coupled to the rack housing 100. The upper enlarging sections 324 extend from a front surface of the upper storage section 321 to opposite left and right sides thereof, and can confront the housing mount section 120. The upper enlarging sections 324 can be attached to the housing mount section 120.

Figure 4:
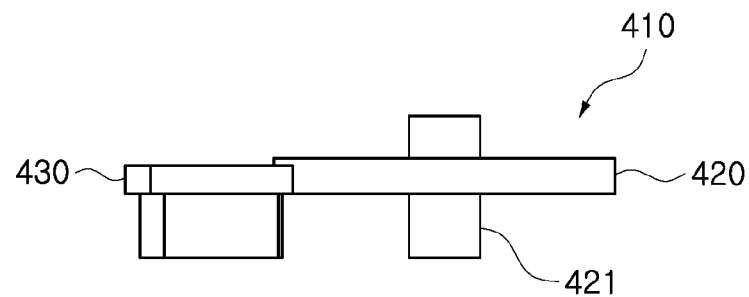
FIG. 4 is a side view illustrating a first sensing section of the steering apparatus for a vehicle according to an embodiment of the present disclosure.
Figure 5:
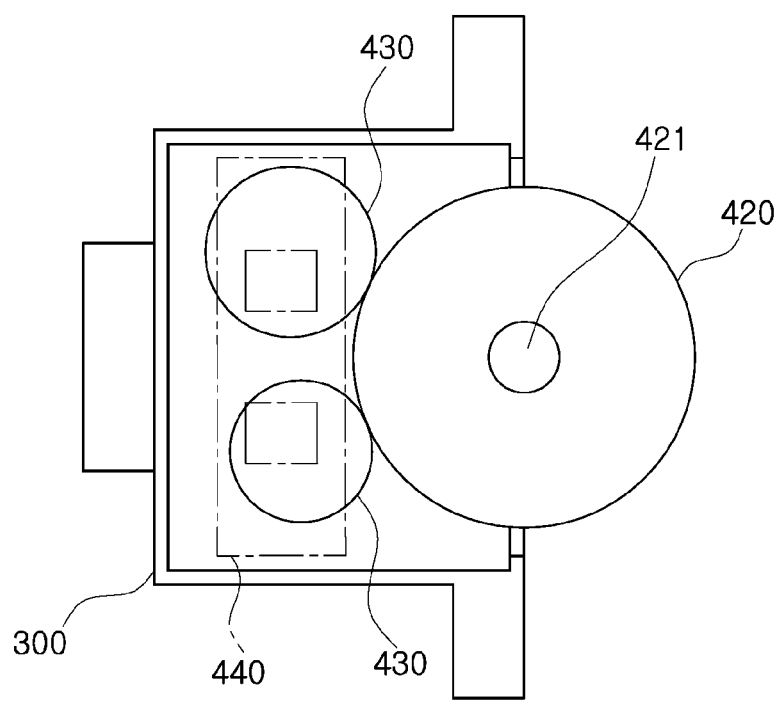
FIG. 5 is a plan view illustrating the first sensing section of the steering apparatus for a vehicle according to an embodiment of the present disclosure.

FIG. 4 is a side view illustrating the first sensing section of the steering apparatus for a vehicle according to the embodiment of the present disclosure, and FIG. 5 is a plan view illustrating the first sensing section of the steering apparatus for a vehicle according to the embodiment of the present disclosure.

Referring to FIGS. 4 and 5, the first sensing section 400 according to the embodiment of the present disclosure includes a transfer gear part 410, a sensing gear parts 430, and a sensing board part 440.

The transfer gear part 410 is mounted on the housing 300 in a rotatable manner. The transfer gear part 410 can be rotated in meshed with the rack bar 200. The transfer gear part 410 is mounted on the lower support section 312 and the upper support section 322 in a rotatable manner.

The transfer gear part 410 includes a sensing transmission part 420 and a transmission shaft part 421. The sensing transmission part 420 is formed on an outer circumferential surface of the transmission shaft part 421. The sensing transmission part 420 is rotated about the transmission shaft part 421. The sensing transmission part 420 can be rotated in mesh with the rack bar 200.

While the rack bar 200 is in mesh with the transfer gear part 410, a linear motion of the rack bar 200 is converted into a rotational motion at the transfer gear part 410. The sensing transmission part 420 may have a spur gear shape.

One or more sensing gear parts 430 are mounted on the housing 300 in a rotatable manner. The sensing gear parts 430 is meshed with the sensing transmission part 420, and is rotated in cooperation with rotation of the sensing transmission part 420.

One or more sensing gear parts 430 may be disposed.

In a case in which the number of the sensing gear parts 430 is two, the two sensing gear parts 430 can be meshed with the sensing transmission part 420 at the same time. In addition, any one of the two sensing gear parts 430 may be directly meshed with the sensing transmission part 420, and the other may be meshed with any one of the sensing gear parts 430 rather than the sensing transmission part 420.

Magnets 431 can be mounted on the sensing gear parts 430.

The sensing board part 440 senses rotations of the sensing gear parts 430. The sensing board part 440 senses rotation amounts of the sensing gear parts 430, and can calculate an amount of movement of the rack bar 200 rotating the sensing gear parts 430 on the basis of the sensed rotation amounts.

The sensing board part 440 measures magnetisms of the magnets 431 of the rotated sensing gear parts 430, and thereby can measure amounts of rotation of the sensing gear parts 430. The sensing board part 440 is disposed above the sensing gear parts 430, and is mounted on the upper housing 320.

It is possible to diversify sensor output according to system requirement performance through a gear ratio combination between the sensing transmission part 420 and the sensing gear parts 430.

Figure 6:
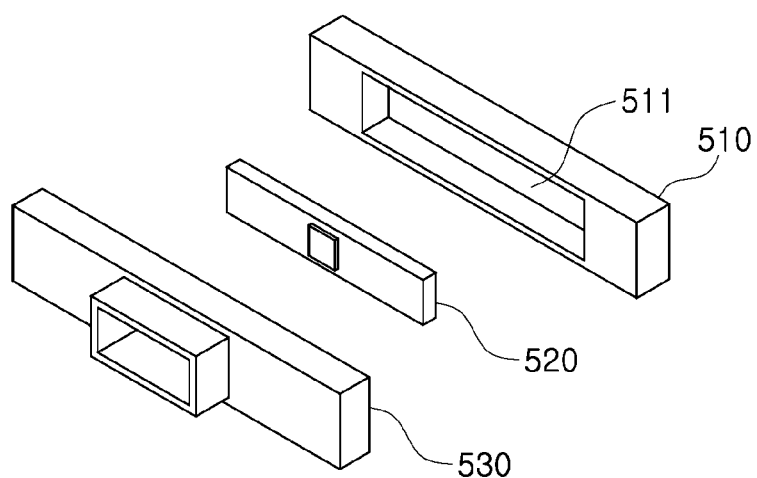
FIG. 6 is a plan view illustrating a second sensing section of the steering apparatus for a vehicle according to an embodiment of the present disclosure.

FIG. 6 is an exploded perspective view illustrating the second sensing section of the steering apparatus for a vehicle according to the embodiment of the present disclosure.

Referring to FIGS. 1, 2, and 6, the second sensing section 500 according to the present embodiment includes a holder 510, a sensing board part 520, and a cover part 530.

The holder 510 is mounted on the housing mount section 120 formed on the housing body section 110. The holder 510 is mounted on the second housing mount section 120*b*.

An outer surface of the holder 510 is formed with a mounting recess or a mounting hole 511 in which the sensing board part 520 is mounted. The holder 510 is inserted into the second housing hole section 121*b* formed on the second housing mount section 120*b*. The sensing board part 520 can be disposed at the second housing hole section 121*b*.

The sensing board part 520 is a type of linear sensor, is mounted on an inner side of the holder 510, and senses an amount of movement of the rack bar 200 in the on-center section.

If the first sensing section 400 senses the amount of movement of the rack bar 200 without a limitation to a specific section, the second sensing section 500 senses the amount of movement of the rack bar 200 with the limitation to the on-center section.

As one example, the magnet 210 can be mounted on the on-center section that is the central portion of the rack bar 200, and the sensing board part 520 can sense the magnet 210 mounted on the rack bar 200. That is, the sensing board part 520 senses the magnet 210 mounted on the central portion of the rack bar 200, and thereby can sense a position of the rack bar 200 within the on-center section.

The sensing board part 520 senses a position of the magnet 210 moved along with the rack bar 200 within a sensing range. That is, the sensed value is changed depending on the position of the magnet 210, and information about the position of the magnet 210 sensed by the sensing board part 520 is transmitted to the control unit, and can accurately calculate a neutral state of the steering wheel, an alignment state of the vehicle driving wheels, and so on.

The cover part 530 is mounted on the holder 510 on which the sensing board part 520 is mounted, and covers an outer surface of the holder 510.

The assembly and operation of the steering apparatus for a vehicle according to the present disclosure having the aforementioned configuration will be described as follows.

The lower housing 310 and the upper housing 320 are assembled, and the first sensing section 400 is mounted between the lower housing 310 and the upper housing 320. The transfer gear part 410 and the sensing gear parts 430 meshed with the transfer gear part 410 are mounted on the lower support section 312 and the upper support section 322 in a rotatable manner.

The sensing board part 440 sensing rotations of the sensing gear parts 430 is mounted on the upper housing 320 so as to be disposed above the sensing gear parts 430.

When the assembly of the first sensing section 400 to the housing 300 is completed, the rack housing 100 through which the rack bar 200 passes is attached to the housing 300. In this case, the transfer gear part 410 is exposed from the housing 300 to the outer portion, is inserted into the housing body section 110 through the housing hole section 121, and is meshed with the rack bar 200. To be specific, a part of the sensing transmission part 420 is meshed with the rack bar 200 at the inner portion of the housing body section 110, while protruding to the outer portion of the housing 300.

In the aforementioned assembly process, the housing 300 in which the first sensing section 400 is mounted can be modulated and provided. The housing 300 to which the first sensing section 400 is attached can be commercialized by coupling the assembled housing 300 with the rack housing 100.

When the assembly of the second sensing section 500 comprised of the holder 510 on which the sensing board part 520 is mounted and the cover part 530 mounted on an outer surface of the holder 510 is completed, the assembly is inserted into the housing body section 110 through the housing hole section 121 so as to correspond to the magnet 210 mounted on the rack bar 200.

In the aforementioned assembly process, the second sensing section 500 can be modularized and provided, and the second sensing section 500 can be coupled to the rack housing 100 for commercialization.

In a case in which the vehicle steering is needed in a state in which the assembly is completed, the rack bar 200 is moved linearly, the transfer gear part 410 meshed with the rack bar 200 is rotated. As the sensing transmission part 420 of the transfer gear part 410 is rotated, the sensing gear parts 430 meshed with the sensing transmission part 420 are rotated.

When the sensing gear parts 430 is rotated, the sensing board part 440 of the first sensing section 400 measures rotation values of the sensing gear parts 430. Afterwards, the first sensing section 400 transmits the measured rotation values of the sensing gear parts 430 to the control unit, and can accurately detect the steering angle of the vehicle driving wheels through the transmitted information.

Further, when the rack bar 200 enters into the on-center section, the sensing board part 520 of the second sensing section 500 senses the position of the magnet 210, and thereby the rack bar 200 returns to the on-center section, and can precisely identify whether it is maintained within the on-center section.

Figure 7:
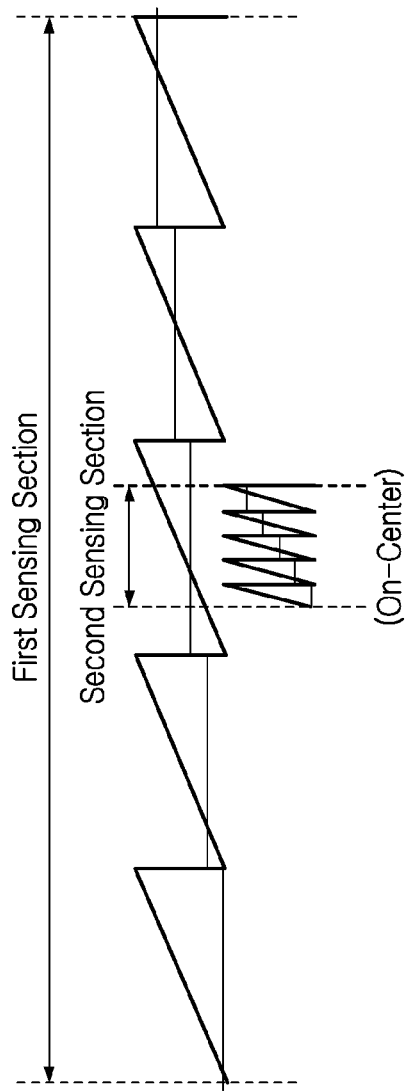
FIG. 7 is an exemplary view illustrating position information of a rack bar of the steering apparatus for a vehicle according to an embodiment of the present disclosure.

Referring to FIG. 7, the steering apparatus for a vehicle according to the embodiment of the present disclosure can widely measure the movement and the movement amount of the rack bar 200 through the first sensing section 400 in an entire section in which the rack bar 200 is movable, and can precisely measure the movement and the movement amount of the rack bar 200 through the second sensing section 500 by limiting the inside of the on-center section. For an example, the position and the movement of the rack bar 200 can be measured within a range of ±200 mm of the first sensing section 400 and within a range of ±20 mm of the second sensing section 500.

According to the present disclosure, since the first sensing section 400 capable of movement information of the rack bar 200 in a wide region is provided, it is possible to lower a management criterion of the sensor for managing the entire region, and to apply a cheaper sensor according to differentiation of specification of the sensor based on each section, and thus costs can be reduced.

Since the second sensing section 500 capable of accurately measuring the movement information of the rack bar 200 within a specified region, i.e. within the on-center section that is importantly managed in the vehicle, is provided, it is possible to acquire position information for accurate linear advance control in order to cope with the vehicle driving and the autonomous traveling.

In this manner, according to the present disclosure, the movement of the rack bar 200 is sensed through the first sensing section 400, and when it is identified, by the first sensing section 400, that the rack bar 200 enters into the on-center section, the movement of the rack bar 200 can be accurately measured through the second sensing section 500.

Beyond the on-center section, by measuring the movement of the rack bar 200 to the first sensing section 400, by measuring the movement of the rack bar 200 to the second sensing section 500, and by doubling the movement information of the rack bar 200 to the sensing section having two different functions, it is possible to improve accuracy and to reduce manufacturing costs.

Further, the steering apparatus for a vehicle according to the embodiment of the present disclosure can accurately provide return to and maintenance of the on-center when driving because a linear movement alignment state of the vehicle wheels is identified through the second sensing section 500 sensing the magnet 210 mounted on the middle portion of the rack bar 200, and it can be managed within the on-center section in the entire movement section of the rack bar 200 with high accuracy as in FIG. 7.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A steering apparatus for a vehicle, the steering apparatus comprising:
   a rack housing;
   a rack bar inserted into an inner portion of the rack housing and configured to move linearly in a lengthwise direction of the rack housing;
   a housing mounted on the rack housing;
   a first sensing section mounted on the housing and configured to sense an amount of movement of the rack bar while being rotated in mesh with the rack bar; and
   a second sensing section mounted on the rack housing and configured to sense the amount of movement of the rack bar within an on-center section,
   wherein the first sensing section includes:
   a transfer gear part mounted on the housing in a rotatable manner and configured to rotate in mesh with the rack bar;
   one or more sensing gear parts mounted on the housing in a rotatable manner and configured to rotate in mesh with the transfer gear part; and
   a first sensing board part configured to sense an amount of rotation of the one or more sensing gear parts,
   wherein the second sensing section includes:
   a holder mounted on the housing mount section, and defining a mounting recess in an outer surface thereof;

a second sensing board part mounted on an inner side of the mounting recess disposed in the holder and configured to sense a magnet mounted on a middle portion of the rack bar; and a cover part configured to cover the outer surface of the holder.

2. The steering apparatus according to claim 1, wherein the rack housing includes:

a hollow housing body section including open ends through which the rack bar passes;

a housing mount section disposed on an outer surface of the housing body section, and configured such that the housing and the second sensing section are mounted on the housing mount section; and one or more housing hole sections disposed on the housing mount section, and configured such that the first sensing section and the second sensing section are disposed on the one or more housing hole sections.

3. The steering apparatus according to claim 2, wherein the housing mount section includes:

a first housing mount section on which the housing is mounted; and a second housing mount section on which the second sensing section is mounted.

4. The steering apparatus according to claim 2, wherein the one or more housing hole sections include:

a first housing hole section on which the first sensing section is disposed; and a second housing hole section on which the second sensing section is disposed.

5. The steering apparatus according to claim 1, wherein the second sensing section is configured to sense a position of the magnet that is moved along with the rack bar within a sensing range of the second sensing board part.

6. A steering apparatus for a vehicle, the steering apparatus comprising:

a rack housing;

a rack bar inserted into an inner portion of the rack housing and configured to move linearly in a lengthwise direction of the rack housing;

a housing mounted on the rack housing;

a first sensing section mounted on the housing and configured to sense an amount of movement of the rack bar while being rotated in mesh with the rack bar; and a second sensing section mounted on the rack housing and configured to sense the amount of movement of the rack bar within an on-center section, wherein the upper housing includes:

a lower storage section, an upper side of which is open;

a lower support section disposed on the lower storage section and supporting the first sensing section in a rotatable manner;

a lower opening section disposed on one side of the lower storage section, and communicating with the rack housing to expose the first sensing section; and a lower enlarging section extending from one side of the lower storage section and coupled to the rack housing.

7. The steering apparatus according to claim 6, wherein the upper housing includes:

an upper storage section covering the lower storage section;

an upper support section disposed on the upper storage section and supporting the first sensing section in a rotatable manner;

an upper opening section disposed on one side of the upper storage section and communicating with the rack housing to expose the first sensing section; and an upper enlarging section extending from one side of the upper storage section and coupled to the rack housing.

\* \* \* \* \*